April 26, 1932.  J. H. SCHLENTER  1,855,871
CONVEYER SYSTEM
Filed March 6, 1929  2 Sheets-Sheet 1

INVENTOR.
John H. Schlenter
BY
Erwin, Wheeler & Woolard

April 26, 1932.  J. H. SCHLENTER  1,855,871
CONVEYER SYSTEM
Filed March 6, 1929  2 Sheets-Sheet 2

INVENTOR.
John H. Schlenter
BY
Erwin, Wheeler & Woolard
ATTORNEYS

Patented Apr. 26, 1932

1,855,871

UNITED STATES PATENT OFFICE

JOHN H. SCHLENTER, OF CASCADE, WISCONSIN

CONVEYER SYSTEM

Application filed March 6, 1929. Serial No. 344,638.

This invention relates to improvements in conveyer systems with particular reference to feeding conveyers for threshing machines.

The object of the present invention is to provide a conveyer system in which an auxiliary conveyer is adjustable with reference to a main conveyer for the purpose of delivering material to the main conveyer from either side or from the end thereof, the adjustment being such that the auxiliary conveyer will not only receive material from any desired point about the end of the main conveyer but will discharge material substantially centrally on the main conveyer.

The invention relates further to the specific driving connections established between the main conveyer and the auxiliary conveyer for the transmission of motion to the auxiliary conveyer while permitting it a range of movement such that it may swing from side to side and at all times deliver its material centrally upon the main conveyer, as desired.

In the drawings—

Like parts are identified by the same reference characters throughout the several views.

Figure 1:
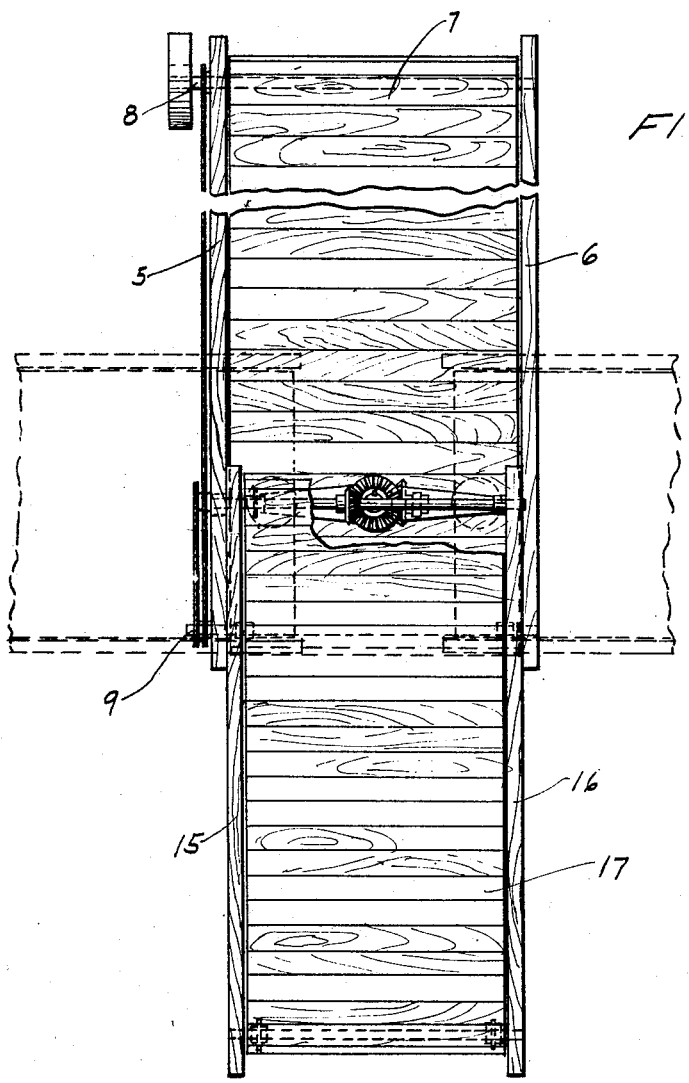
Figure 1 is a plan view of a conveyer system embodying this invention showing in dotted lines two possible alternative positions of the auxiliary conveyer.

The main conveyer comprises a frame having side members 5 and 6 between which the conveyer belt 7 is carried about a drive shaft 8 at the forward end of the frame and a driven shaft 9 at the rear end thereof.

The driven shaft 9 of the main conveyer carries a sprocket 10 from which motion is transmitted through chain 11 to a sprocket 12 on a cross shaft 14 which supports, as well as drives, the auxiliary conveyer.

The auxiliary conveyer comprises a frame similar to that of the main conveyer and including side members 15 and 16 between which the conveyer belt 17 is operated, being supported and driven about shaft 18 at its forward end and shaft 19 at its rearward end. Motion is transmitted to shaft 18 through a chain 20 and sprockets 21 and 22, the latter being carried by a cross shaft 23 journalled in the lower part of the frame of the auxiliary conveyer.

The auxiliary conveyer is supported by means of a double yoke comprising yoke members 24 and 25 in swiveled relation at 26 about the axis of a short vertical drive shaft 27 which transmits motion through the swivel joint while providing a king pin for such joint. The vertical shaft 27 carries bevel pinions 28 and 29 which mesh respectively with pinions 30 and 31, the former being on cross shaft 23 of the auxiliary conveyer and the latter being splined to cross shaft 14 of the main conveyer.

Figure 2:
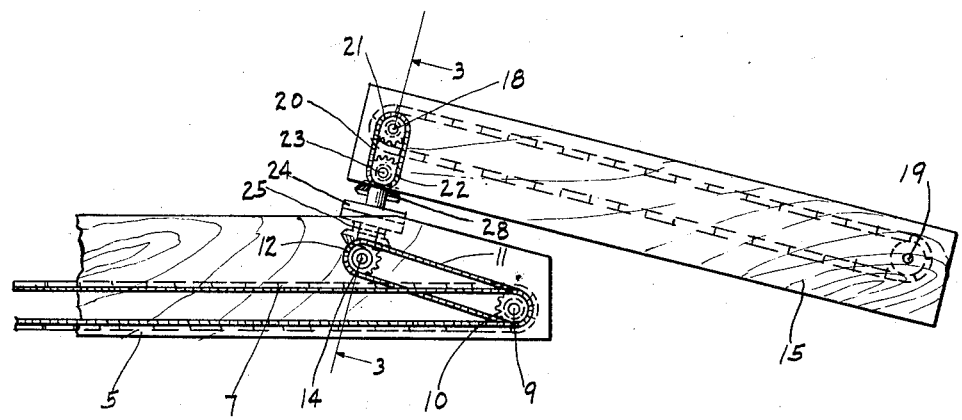
Figure 2 is a detail side elevation of the auxiliary conveyer system and the rear portion of the main conveyer.
Figure 3:
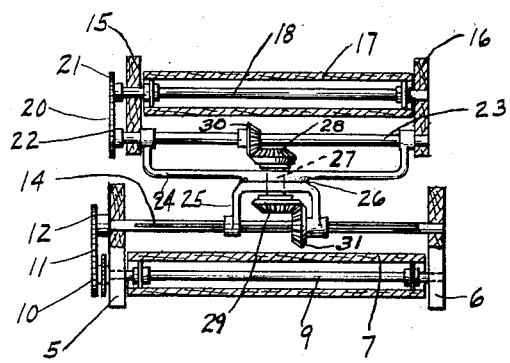
Figure 3 is a detail view taken in the section indicated at 3—3 in Figure 2.

It will be noted that the arms of yoke 25 on the latter cross shaft are fairly close together, thus making it possible to reciprocate laterally the members providing a vertical turning axis for the auxiliary conveyer in any of the various positions of the auxiliary conveyer. It will be obvious that the splined connection between pinion 31 and its shaft 14 will transmit motion to the auxiliary conveyer from the main conveyer or vice versa. The fact that power is transmitted to the auxiliary conveyer on the axis about which the auxiliary conveyer turns from side to side, ensures the operative drive of the auxiliary conveyer in any of its swinging positions. It is also possible to move the free end of the auxiliary conveyer vertically to any desired elevation about shaft 23 as a fulcrum and, since power to the auxiliary conveyer is transmitted through such shaft, its driving connection to the auxiliary conveyer is maintained in any of its vertical swinging adjustments.

Where the conveyer system is being fed from a source immediately at the rear of the main conveyer, the auxiliary conveyer may be aligned longitudinally with the main conveyer but inclined with reference thereto, as shown in Figures 1 and 2. If, however, it is desired to feed the main conveyer from the side, the auxiliary conveyer may be swung in a horizontal plane to any desired position, such, for example, as those positions illustrated in dotted lines in Figure 1. If the auxiliary conveyer were merely swung about vertical drive shaft 27 as a fulcrum, it will be obvious that its discharge would fall wholly at one side of the center of the main conveyer. This would load the main conveyer unevenly and would be disadvantageous in the case of a threshing machine since one side of the cylinder only would be handling grain while the other side would be running idle. In order to avoid this objection, the above described arrangement is provided whereby the entire auxiliary conveyer may be shifted bodily laterally with respect to the main conveyer so that the discharge of the auxiliary conveyer may at all times fall directly upon the center of the main conveyer. This relation of the parts is also illustrated in dotted lines in Figure 1.

From the foregoing description, it will be apparent that I have provided a conveyer system in which an auxiliary conveyer may be formed either horizontally or vertically with respect to a main conveyer and may be adjusted bodily in a lateral direction with respect to the main conveyer in order to maintain a proper delivery to the main conveyer in any position of the auxiliary conveyer and to maintain at all times a driving connection between the two conveyers.

I claim:

1. In a device of the character described, the combination of a pair of conveyers adapted for relative angular adjustment, and means extending transversely of one of said conveyers for adjusting the delivery end of the other of the conveyers bodily in a lateral direction whereby the discharge of said last mentioned conveyer may be directed substantially upon the center of the other of said conveyers, together with means for maintaining a mechanical driving connection between said conveyers in the said relative position thereof.

2. In a device of the character described, the combination with a main conveyer having a frame provided with a cross shaft operatively connected to said conveyer, of an auxiliary conveyer provided with a frame having a cross shaft operatively connected to the auxiliary conveyer, swiveled yoke members connecting said cross shafts, and motion transmitting connections between said cross shafts including a shaft co-axial with the swivel of said yoke members, one of said yoke members being slidable longitudinally in the direction of its cross shaft, whereby the discharge of the auxiliary conveyer may be centered upon the main conveyer in any swiveled relation of said yoke member.

3. The combination with a main conveyer having a frame provided with a cross shaft and an auxiliary conveyer having a frame provided with a cross shaft, said conveyers being operatively connected to their respective cross shafts, of yokes in mutually swiveled relation connecting said cross shafts and arranged to support the auxiliary conveyer from the main conveyer, one of said yokes being axially reciprocable upon the cross shaft to the main conveyer, a vertical shaft co-axial with the swivel between said yokes, gears upon said vertical shaft and pinions upon said cross shafts meshing with said gears, the pinion on the cross shaft of the main conveyer being splined thereto for sliding movement thereon with said yoke, said auxiliary conveyer being pivotally and laterally movable with respect to said main conveyer while maintaining driving connection therewith.

4. The combination with a pair of conveyers pivotally adjustable in horizontal and vertical planes, of means for moving said conveyers laterally relative to each other, said conveyers being provided with driving connections adapted to maintain a motion transmitting relation between said conveyers and any of the positions thereof possible by virtue of said movements.

5. In a conveyer system, a main conveyer, a main conveyer frame, an auxiliary conveyer, an auxiliary conveyer frame, a support on said main conveyer frame supporting said auxiliary conveyer frame, said auxiliary conveyer frame being pivotally mounted on said support for vertical and horizontal movement about said support, and means for moving said auxiliary conveyer slidably on said support for movement laterally of said main conveyer.

JOHN H. SCHLENTER.